(12) United States Patent
Elorza Gomez et al.

(10) Patent No.: US 12,123,419 B2
(45) Date of Patent: Oct. 22, 2024

(54) COMPRESSOR FOR AN ENGINE

(71) Applicant: MTU Aero Engines AG, Munich (DE)

(72) Inventors: Sergio Elorza Gomez, Karlsfeld (DE); Werner Humhauser, Moosburg (DE); Roland Matzgeller, Hebertshausen (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/345,319

(22) Filed: Jun. 30, 2023

(65) Prior Publication Data
US 2024/0003353 A1    Jan. 4, 2024

(30) Foreign Application Priority Data

Jul. 4, 2022    (DE) .................... 10 2022 116 667.8

(51) Int. Cl.
*F04D 19/02*    (2006.01)
*F02C 3/06*    (2006.01)

(52) U.S. Cl.
CPC ............... *F04D 19/02* (2013.01); *F02C 3/06* (2013.01)

(58) Field of Classification Search
CPC .................................. F04D 19/02; F02C 3/06
USPC .......................................................... 415/60
See application file for complete search history.

(56) References Cited

U.S. PATENT DOCUMENTS

| | | | |
|---|---|---|---|
| 10,550,700 B1 * | 2/2020 | Howarth | ............ F01D 5/28 |
| 2017/0002659 A1 * | 1/2017 | Epstein | .......... F02K 3/025 |
| 2020/0291865 A1 * | 9/2020 | Howarth | .......... F01D 15/12 |

OTHER PUBLICATIONS

Grieb, H.: Projektierung von Turboflugtriebwerken (Project planning of turbo aircraft engines). Basel, Switzerland, Springer Basel AG, 2004. pp. 206, 207.—ISBN 978-3-0348-9627-6.
Wisler D C et al: "Preliminary Design Study of Advanced Multi-stage Axial Flow Core Compressors", Feb. 1, 1977 (Feb. 1, 1977), XP093105940, URL:https://ntrs.nasa.gov/api/citations/19770013161/downloads/19770013161.pdf.
Lei Fan et al: "Preliminary Optimization of Multi-Stage Axial-Flow Industrial Process Compressors Using Aero-Engine Compressor Design Strategy", Applied Sciences, Bd. 11, Nr. 19 (Oct. 5, 2021), p. 9248, XP093105629, ISSN: 2076-3417, DOI: 10.3390/app1199248.

* cited by examiner

*Primary Examiner* — Michael L Sehn
(74) *Attorney, Agent, or Firm* — Hinckley, Allen & Snyder, LLP; David R. Josephs

(57) ABSTRACT

The invention relates to a compressor for an engine, wherein the compressor has compressor stages arranged in succession in a flow direction of the compressor and each compressor stage has a rotating blade cascade and a guide vane cascade arranged downstream of the rotating blade cascade and the rotating blade cascade and the guide vane cascade each have an aspect ratio.

15 Claims, 4 Drawing Sheets

COMPRESSOR FOR AN ENGINE

BACKGROUND OF THE INVENTION

The invention relates to a compressor for an engine, wherein the compressor has compressor stages that are arranged in succession in the flow direction of the compressor and each compressor stage has a rotating blade cascade and a guide vane cascade arranged downstream of the rotating blade cascade and the rotating blade cascade and the guide vane cascade each have an aspect ratio of a mean height to a mean chord length of a blade or vane.

Efforts are being made for aircraft engines to consume less fuel, to emit fewer emissions, and, in addition, to be quieter as well. To this end, for example, an effort is being made to increase the thermal efficiency of the engine by increasing the overall pressure ratio (OPR) of the compressor in order to reduce fuel consumption. An increase in the temperatures in the compressor associated therewith also demands aerodynamically more slowly rotating compressors, which, in turn, necessitates more compressor stages in order to make possible an adequate service life of engine components, in particular for components in a compressor outlet region that is arranged downstream. This can be achieved, for example, by increasing the number of compressor stages. In the process, at the same time, a change in the length or an increase in the length of the compressor should be avoided or at least minimized in order keep the total length of the engine within acceptable limits.

The aspect ratio, that is, the ratio of a mean blade or vane height to a mean chord length of blades or vanes of axial compressor cascades is a crucial factor in the design of the compressor. The choice of high aspect ratios makes possible short overall lengths of compressors, but entails losses in performance and stability. Known low-load compressors often have high aspect ratios over all blade or vane cascades. Modern high-load compressors, in contrast, necessitate blade or vane cascades with low aspect ratios, but this leads to greater compressor lengths.

SUMMARY OF THE INVENTION

Based on this, the object of the present invention is to provide a compressor for an engine that makes possible, in particular, a high overall pressure ratio, without subjecting the compressor components to too great a thermal load. This is achieved in accordance with the present invention.

Proposed for achieving this object is a compressor for an engine, in particular an aircraft engine, wherein the compressor has compressor stages that are arranged in succession in the flow direction of the compressor and each compressor stage has a rotating blade cascade and a guide vane cascade that is arranged downstream of the rotating blade cascade and the rotating blade cascades and the guide vane cascades each have an aspect ratio of a mean height to a mean chord length of a blade or vane. The compressor stages are hereby designed in such a way that
  (a) a value of a ratio between the aspect ratio of the second rotating blade cascade and the aspect ratio of the penultimate guide vane cascade is greater than 2.0 and/or
  (b) a value of a ratio between the aspect ratio of the second rotating blade cascade and the aspect ratio of the last rotating blade cascade is greater than 2.0, and/or
  (c) a value of a ratio between the aspect ratio of the first guide vane cascade and the aspect ratio of the penultimate guide vane cascade is greater than 2.8.

This makes it possible to improve the compressor, in particular in accordance with prespecified constraints, such as, for example, a predetermined flow channel height of the compressor of the engine or a predetermined maximum length of the compressor or of the engine. In comparison to known compressors, the rotating blade cascades and/or the guide vane cascades of the compressor stages can be designed or laid out in a coordinated manner with one another in such a way that an overall pressure ratio of the compressor can be increased in comparison to known compressors, in particular without losses of stability. In particular, it is also possible to provide additional compressor stages without any or with only a small increase in the length of the compressor. The overall pressure ratio is hereby, in particular, the ratio of the back pressure, measured at an upstream inlet side and a downstream outlet side of the compressor of the engine.

The compressor is, in particular, a compressor of an aircraft engine, which typically, besides the compressor, has a fan, a combustion chamber, and a turbine. For example, the engine can be designed as a turbofan engine. Surrounding air is sucked in by the fan and compressed in the compressor in order to increase the pressure, in particular progressively in the flow direction. In the combustion chamber arranged downstream to the compressor in the flow direction of the engine, the compressed working fluid is usually mixed with a fuel and this mixture is then combusted in order to produce combustion gases having high pressure and high temperature. The combustion gases flow progressively from the combustion chamber into the turbine, where they expand and thereby release energy. Owing to the expansion of the combustion gases, a rotor shaft in the turbine section can be driven and, for example, is (also) linked to a generator in order to produce electric energy. Following the turbine, the combustion gases can leave the engine via an exhaust gas outlet.

The compressor has a number of compressor stages, which are positioned within a flow channel of the engine, which, in particular, tapers in the flow direction, or of the flow of combustion gases. The compressor stages thereby have a geometry that is adapted to a flow channel of the engine and tapers in the flow direction in order to achieve a compression of the working fluid. Each of the compressor stages thereby has a rotor that can rotate around an engine axis or a rotational axis of the engine, on which usually a plurality of rotating blade cascades are arranged and, following which in each case, downstream fixed stators or guide vane cascades are arranged. The rotating blade cascades and the guide vane cascades each have a plurality of curved blades or vanes, in particular aerodynamically curved blades or vanes, each of identical design. The blades or vanes are arranged radially in the flow channel of the compressor and extend between a blade or vane root and a blade or vane tip, in each case between a leading edge and a trailing edge along the flow direction. Between the leading edge and the trailing edge, there extends, on one side of the blade or vane, a suction side and, on the other side, a pressure side, which are arranged lying opposite to each other. The blades or vanes or the respective rotating blade cascades or guide vane cascades are characterized by an aspect ratio, with the aspect ratio being a ratio of a mean blade or vane height between the blade or vane root and the blade or vane tip to a mean chord length of a blade or vane cross section of the respective blade(s) or vane(s).

The mean blade or vane height h is here, in particular, the arithmetic mean of all blade or vane heights between the leading edge and the trailing edge or the integral of the blade or vane height in the interval between the leading edge and the trailing edge of a blade or vane. The mean chord length or the mean length of the chord is, in particular, the arithmetic mean of all chord lengths between the blade or vane tip and the blade or vane root or the integral of the chord length in the interval between the blade or vane tip and the blade or vane root of a blade or vane, with the chord length being the shortest connecting line between the leading edge and the trailing edge of the respective blade or vane in a blade or vane cross section. The blade or vane cross section is here, in particular, perpendicular to a radial of the engine axis or compressor axis.

The first compressor stage is the most upstream compressor stage at the inlet side of the compressor or the first stage of the compressor in the flow direction; the first guide vane cascade is correspondingly the most upstream guide vane cascade or, in the flow direction, the first guide vane cascade of, in particular, a plurality of guide vane cascades of the compressor that are arranged axially in succession in the flow direction of the compressor. This first guide vane cascade is here, in particular, the inlet guide wheel of the compressor.

The second compressor stage is a compressor stage that is arranged downstream adjacent to the first compressor stage or the second stage of the compressor in the flow direction. The second rotating blade cascade is correspondingly a rotating blade cascade that is arranged downstream of the first rotating blade cascade or in the flow direction, of, in particular, a plurality of rotating blade cascades of the compressor that are arranged axially in succession in the flow direction of the compressor. This second rotating blade cascade is here, in particular, arranged downstream adjacent to the inlet guide vane cascade of the compressor.

The last compressor stage is a last stage of the compressor arranged most downstream or, in the flow direction; the last stage of the compressor is correspondingly a last rotating blade cascade, arranged most downstream or in the flow direction, of, in particular, a plurality of rotating blade cascades of the compressor arranged axially in succession in the flow direction of the compressor.

The penultimate compressor stage is a compressor stage arranged adjacent upstream with respect to the last stage of the compressor arranged most downstream or in the flow direction. The penultimate guide vane cascade is correspondingly a guide vane cascade arranged axially with respect to the guide vane cascade arranged most downstream or the last guide vane cascade in the flow direction or a guide vane cascade of, in particular, a plurality of guide vane cascades arranged upstream with respect to an outlet guide vane cascade.

The invention is based on, among other things, the idea of increasing the aspect ratios of the front and intermediate compressor stages or blade or vane cascades in comparison to known compressors and/or of decreasing the aspect ratios of the rear blade or vane cascades in order to increase the overall pressure ratio of the compressor and, at the same time, to reduce a change in length of the compressor, which, in particular, results from the provision of additional compressor stages. In this way, a reduced thermal load on the compressor components can be achieved.

Because the compressor stages or the rotating blade cascades and/or guide vane cascades that are arranged in the front or most upstream region of the compressor each have a larger radial extension than the compressor stages or the rotating blade cascades and/or guide vane cascades that are arranged downstream, it is possible by way of an increase in the aspect ratio of the front or most upstream blades or vanes or blade or vane cascades, that is, by way of an increase in the blade or vane height and/or a slimming of the blade or vane width or a shortening of the blade or vane chord, to achieve a reduction in length of the compressor. The compressor stages or the rotating blade cascades and/or guide vane cascades that are arranged downstream each have a smaller radial extension and, by way of a reduction of their aspect ratio, that is, a reduction in the blade or vane height and/or a widening of the blade or vane or an expansion of the mean blade or vane chord, contribute to a stabilization of operation, with only a small increase in the length of the compressor resulting thereby.

The proposed compressor makes possible the combination of these two measures, namely, the enlargement of the aspect ratio for compressor stages arranged upstream and the reduction in the aspect ratio for compressor stages arranged downstream, as a result of which a compact and thermally advantageous design of the compressor can be achieved.

For the compressor according to the invention, the value of the ratio between the aspect ratio of the second rotating blade cascade and the aspect ratio of the penultimate guide vane cascade and/or the value of the ratio between the aspect ratio of the second rotating blade cascade and the aspect ratio of the last rotating blade cascade is greater than 2.2 and, in particular, is greater than 2.25. By incorporating the aspect ratio of the second rotating blade cascade as a relevant parameter for the design of the compressor, it is possible, in particular, to design at will a size and/or construction of the first rotating blade cascade of the first compressor stage in order, for example, to satisfy special requirements in regard to damage due to foreign objects, that is, foreign object damage (FOD).

In one embodiment of the compressor, the value of the ratio between the aspect ratio of the first guide vane cascade and the aspect ratio of the penultimate guide vane cascade is greater than 3.0 and, in particular, is greater than 3.05. By incorporating the aspect ratio of the penultimate guide vane cascade as a relevant parameter for the design of the compressor, it is possible to design at will a size and/or construction of the guide vane cascade of the last compressor stage, in particular of the outlet guide wheel, in order, for example, to be able to satisfy special conditions in regard to flow control.

In one embodiment, the number of compressor stages that are to be arranged in succession in a flow direction of the compressor is determined. The number of compressor stages can thereby be specified in advance and, depending on this number of compressor stages, the engine can be designed by means of at least one of the above-described criteria a) to c) in order to make possible an increase in the overall pressure ratio. In an alternative embodiment, an overall pressure ratio can be determined or established and the number of compressor stages can be determined on the basis thereof.

In summary, a compressor for an engine is proposed, which has compressor stages that are arranged in succession in the flow direction of the compressor and each compressor stage has a rotating blade cascade and a guide vane cascade arranged downstream of the rotating blade cascade, wherein the rotating blade cascades and the guide vane cascades each have an aspect ratio as described above. By means of such a design, it is possible to increase the overall pressure ratio (OPR) of the compressor, whereby the thermal efficiency of the engine can be increased and the fuel consumption can be reduced. In comparison to known compressors, it is possible to provide a larger number of compressor stages and, in particular, to avoid an increase in length of the compressor and, accordingly, of the engine or at least to minimize it in order to not exceed, in particular, a maximum total length of the engine.

In one embodiment, the compressor comprises a high-pressure compressor or is designed as a high-pressure compressor. The features and advantages described in conjunction with the invention thereby find application to the high-pressure compressor and its high-pressure compressor stages as well as to its rotating blade cascades or guide vane cascades and its overall pressure ratio or the overall pressure ratio of the compressor.

BRIEF DESCRIPTION OF THE DRAWING FIGURES

Further features, advantages, and possible applications of the invention ensue from the following description in conjunction with the figures. In general, it holds that features of the various exemplary aspects and/or embodiments described herein can be combined with one another, provided that this is not clearly excluded in connection with the disclosure.

In the following part of the description, reference is made to the figures, which are shown for highlighting specific aspects and embodiments of the present invention. It is understood that other aspects can also be used and that structural or logical changes in the illustrated embodiments are possible without leaving the scope of the present invention. The following description of the figures is therefore to be understood as nonlimiting. Shown herein:

DESCRIPTION OF THE INVENTION

Figure 1:
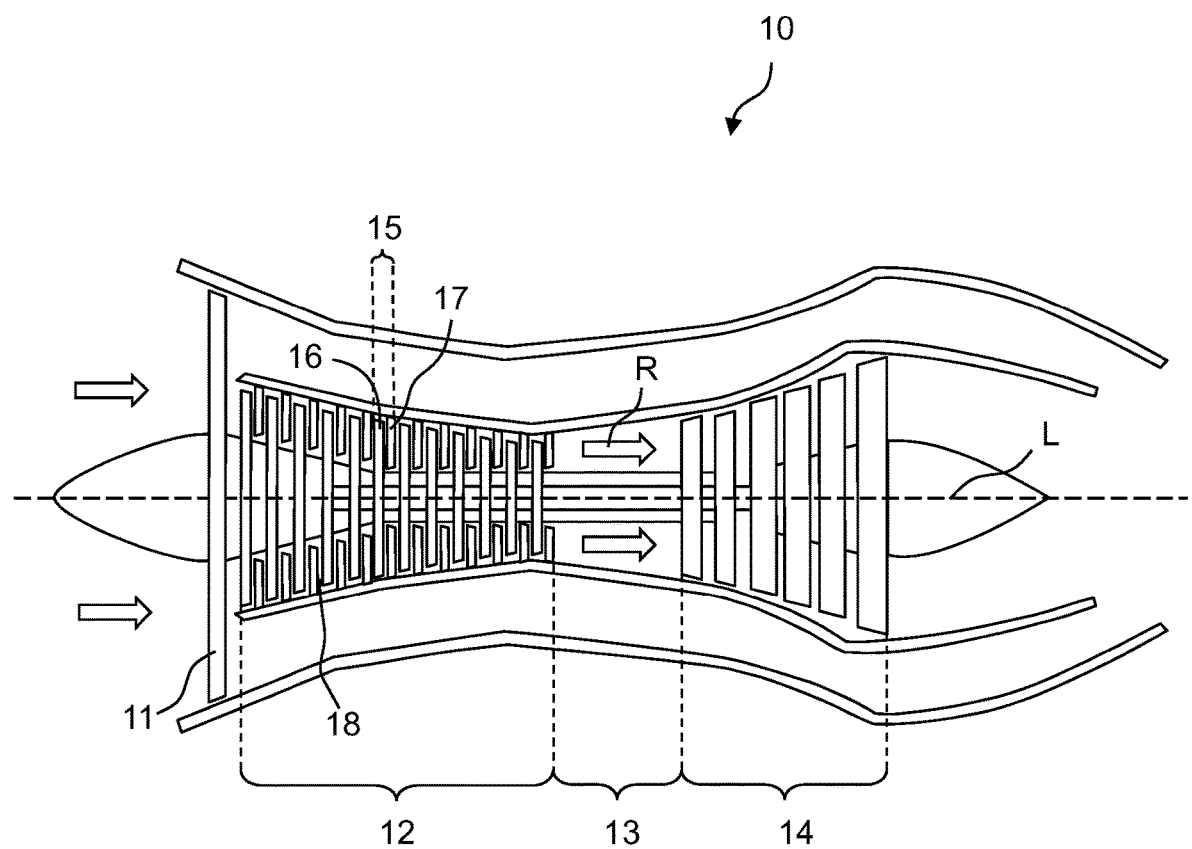
FIG. 1 is a schematic illustration of an exemplary engine.

FIG. 1 shows, by way of example, an illustration of an exemplary embodiment of an engine 10, which has a compressor 12 according to the invention, in a schematic sectional view.

The engine 10 or the turbomachine has a fan 11, a compressor 12, a combustion chamber 13, and a turbine 14 arranged in succession in the flow direction R. The compressor 12 is constructed from a plurality of compressor stages 15, with each compressor stage 15 having a rotating blade cascade 16 and a guide vane cascade 17 arranged following it in the flow direction R. Each such compressor stage 15, in particular a high-pressure compressor stage, has a rotating blade cascade 16 and a guide vane cascade 17 arranged in the flow direction R following the rotating blade cascade 16 and can be or has been dimensioned or designed by means of the method according to the invention for designing a compressor 12 for an engine 10. The rotating blade cascade 16 and the guide vane cascade 17 each have an aspect ratio V of a mean height h to a mean chord length S of a blade or vane 20.

During operation of the compressor 12, the rotating blade cascades 16 rotate around the rotational axis L of the engine 10, while the guide vane cascades 17 are arranged in a stationary manner. In the compressor 12, the air that is sucked in by means of the fan 11 is compressed and then combusted with admixed fuel in the downstream combustion chamber 13. The energy-rich flow thereby formed flows through the turbine 14 and in this case drives the rotating blade dispositions arranged there.

The rotating blade cascades 16 and the guide vane cascades 17 here each have a plurality of blades or vanes 20, which are not depicted and which extend radially with respect to the rotational axis L of the engine 10 in a flow channel 18 of the engine 10.

Figure 2:
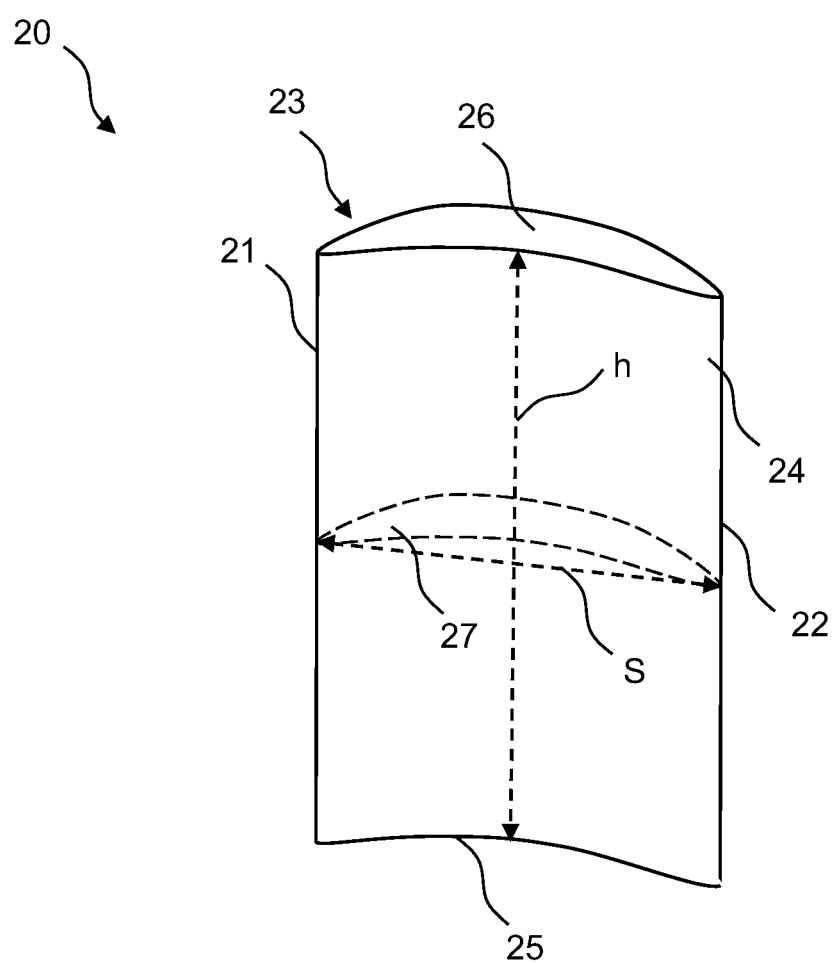
FIG. 2 is a schematic illustration of an exemplary blade or vane of a blade or vane cascade for a compressor according to the invention.

FIG. 2 shows a schematic illustration of an exemplary blade or vane 20 of a compressor 12 of the exemplary embodiment of an engine 10 from FIG. 1 by way of example. The illustration of the blade or vane 20 is to be understood here as being purely illustrative and can be a blade or vane 20 of a rotating blade cascade 16 or of a guide vane cascade 17, respectively.

The blade or vane 20 has a leading edge 21 and a trailing edge 22, which are joined to each other through a suction side 23 and a pressure side 24. The shortest connecting line between the leading edge 21 and the trailing edge 22 in a respective blade or vane cross section 27 arranged perpendicular to a radial of the engine axis L forms a chord S. The airfoil 20 extends in a radial direction with respect to the engine axis L over a blade or vane height h from a blade or vane root 25 to a blade or vane tip 26. The blade or vane height h is measured essentially parallel to a radial of the engine axis L.

In the design of a compressor 12 for an engine 10, an aspect ratio V of at least one predetermined rotating blade cascade 16 or of at least one predetermined guide vane cascade 17 or the aspect ratio V of the blade or vane 20 forming the respective cascade is taken. The aspect ratio V is defined here as the ratio of a mean height h to a mean chord length S of the blades or vanes 20 of the respective rotating blade cascade 16 or guide vane cascade 17.

The mean blade or vane height h is here, in particular, the arithmetic mean of all blade or vane heights h between the leading edge 21 and the trailing edge 22 or the integral of the extension of the blade or vane height S in the interval between the leading edge 21 and the trailing edge 22 of the respective blade or vane 20. The mean chord length or the mean length of the chord S is, in particular, the arithmetic mean of all chord lengths S between the blade or vane tip 26 and the blade or vane root 27 or the integral of the chord length S in the interval between the blade or vane tip 26 and the blade or vane root 27 of the respective blade or vane 20.

Figure 3:
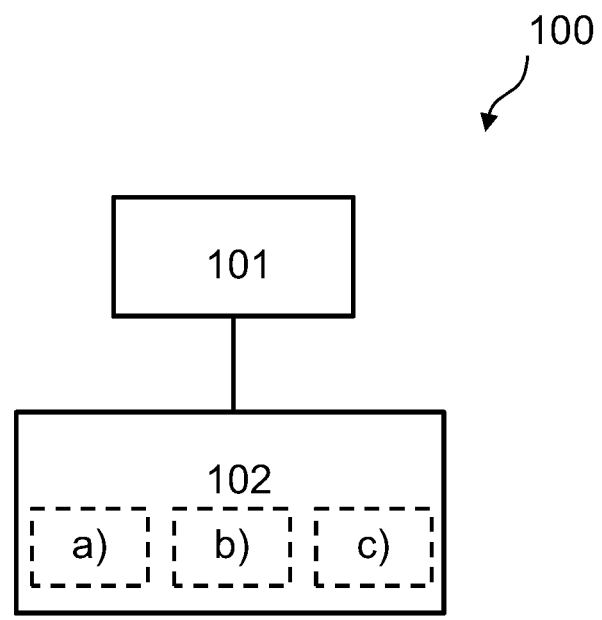
FIG. 3 is a schematic illustration of a flow chart of a method for designing a compressor for an engine.

FIG. 3 shows a schematic illustration of a flow chart of an exemplary embodiment of a method according to the invention 100 for the design of a compressor 12 for the engine 10 from FIG. 1.

In a first step 101, there are determined a number of compressor stages 15 that are to be arranged, in particular in succession, in the engine 10 being designed in the flow direction R of the compressor 12 of the engine 10. Depending on the determined number of compressor stages 15, it is possible in a second step 102 to design the compressor stages 15 on the basis of the criteria described herein. These criteria are that a) a value of a ratio between the aspect ratio V of the second rotating blade cascade 16 and the aspect ratio V of the penultimate guide vane cascade 17 is greater than 2.0, in particular is greater than 2.2, and, further, in particular is greater than 2.25 and/or b) a value of a ratio between the aspect ratio V of the second rotating blade cascade 16 and the aspect ratio V of the last rotating blade cascade 16 is greater than 2.0, in particular is greater than 2.2, and, further, in particular is greater than 2.25 and/or c) a value of a ratio between the aspect ratio V of the first guide vane cascade 17 and the aspect ratio V of the penultimate guide vane cascade 17 is greater than 2.8, in particular is greater than 3.0, and, further, in particular is greater than 3.05.

Figure 4:
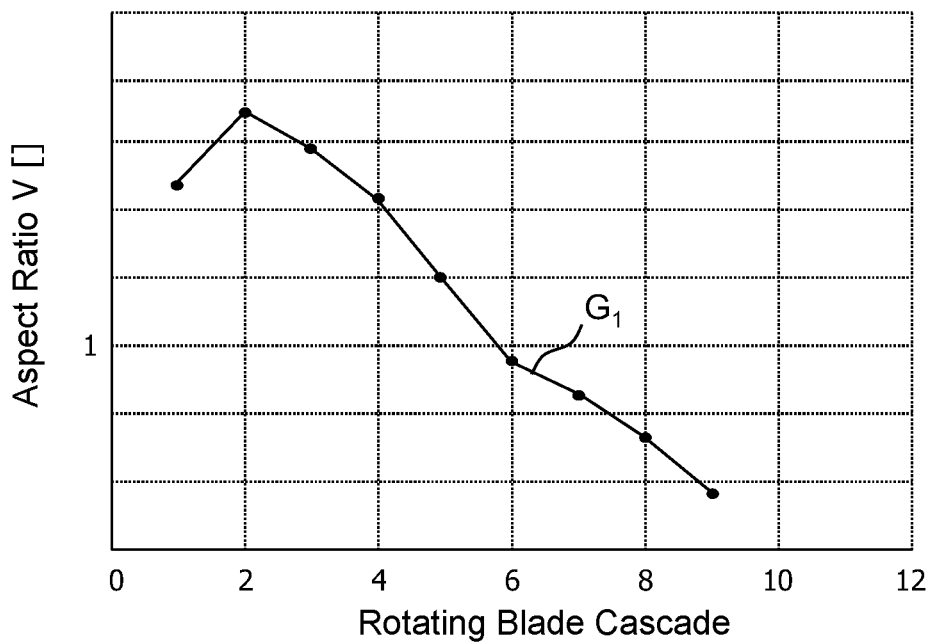
FIG. 4 is a diagram of an exemplary plot of a rotating blade or vane aspect ratio versus a compressor blading of a compressor according to the invention.

FIG. 4 shows a diagram of an exemplary plot $G_1$ of an aspect ratio V versus the rotating blade cascade 16 of an engine 10, by way of example, with a compressor 12 having nine compressor stages 15. The compressor stages 15 are arranged in succession in the flow direction R and are correspondingly depicted numerically. Because the aspect ratio V of the first rotating blade cascade 16, in particular owing to the measure for diminishing damage due to foreign objects, usually cannot be chosen at will, a design of the aspect ratio V of the second rotating blade cascade 16 and, in particular, of the penultimate and last rotating blade cascade 16 can be carried out in accordance with the method 100.

It can be deduced from the plot $G_1$ that the aspect ratios V of the compressor stages 15 of the respective blades 20 of the rotating blade cascades 16 decrease starting from the second compressor stage 15. In comparison to conventional compressors, it is possible, in particular, to increase the aspect ratios V of the front to intermediate rotating blade cascades 16, particularly also of the guide vane cascades 17. Because these front compressor stages 15, in comparison to the compressor stages 15 arranged downstream, are geometrically larger, it is possible by way of an increase in the aspect ratios V in the most upstream compressor region to achieve a resulting axial savings in terms of length. Because, during partial load operation of the engine 10, the front compressor stages 15 act in a stability-limiting manner, use is made, in particular, of gap-vortex-stabilizing technologies.

Figure 5:
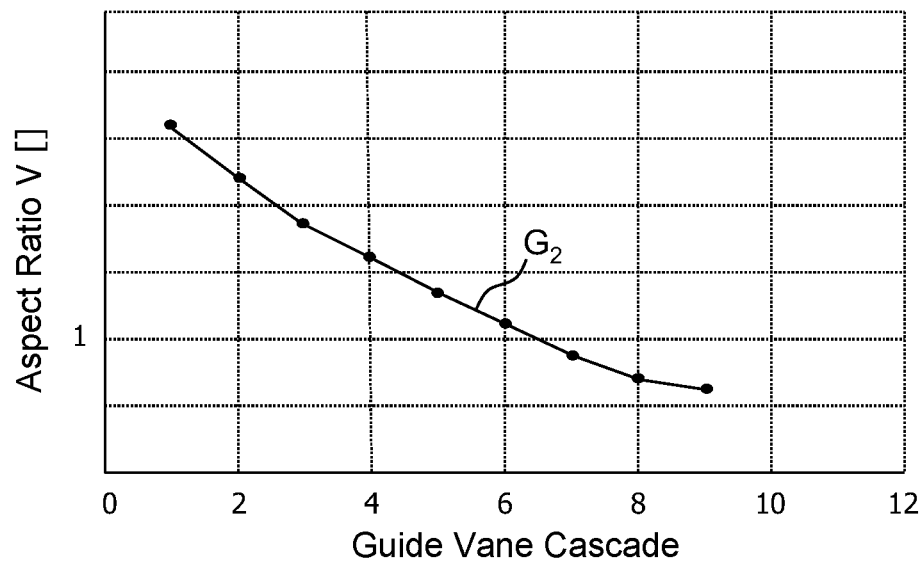
FIG. 5 a diagram of an exemplary plot of a guide vane aspect ratio versus a compressor blading of a compressor according to the invention.

FIG. 5 shows a diagram of an exemplary plot $G_2$ of an aspect ratio V versus the guide vane cascade 17 of an engine 10, by way of example, with a compressor 12 having nine compressor stages 15. The compressor stages 15 are arranged in succession in the flow direction R and are correspondingly depicted numerically.

It ensues from the illustration in FIG. 5 that the aspect ratios V versus the vanes of the compressor 12 decrease in the flow direction R. In comparison to known compressors, it is possible, in particular, for the aspect ratios V of the rear and downstream guide vane cascades 17, particularly also of the rotating blade cascades 16, to be reduced. Because these rear compressor stages 15, in comparison to the compressor stages 15 arranged upstream, are geometrically smaller, it is possible through a reduction in the aspect ratios V in the downstream compressor region to achieve a stabilization of the compressor 12 during operation.

What is claimed is:

1. A compressor, for an engine, which has compressor stages arranged in succession in a flow direction of the compressor and each compressor stage has a rotating blade cascade and a guide vane cascade arranged downstream of the rotating blade cascade, wherein the rotating blade cascade and the guide vane cascade each have an aspect ratio of a mean height to a mean chord length of a blade or vane, wherein the compressor stages are configured and arranged where a value of a ratio between the aspect ratio of the second rotating blade cascade and the aspect ratio of the penultimate guide vane cascade for the entire rotating blade cascade and guide vane cascade of the compressor is greater than 2.0.

2. The compressor according to claim 1, wherein the value of a ratio between the aspect ratio of the second rotating blade cascade and the aspect ratio of the penultimate guide vane cascade and/or wherein a value of a ratio between the aspect ratio of the second rotating blade cascade and the aspect ratio of the last rotating blade cascade is greater than 2.2.

3. The compressor according to claim 1, wherein the value of a ratio between the aspect ratio of the first guide vane cascade and the aspect ratio of the penultimate guide vane cascade is greater than 3.0.

4. The compressor according to claim 1, wherein the compressor has more than six compressor stages, which are arranged in succession in a flow direction of the compressor.

5. The compressor according to claim 1, wherein the aspect ratio of the first rotating blade cascade is smaller than that of the second rotating blade cascade and of the third rotating blade cascade.

6. A compressor, for an engine, which has compressor stages arranged in succession in a flow direction of the compressor and each compressor stage has a rotating blade cascade and a guide vane cascade arranged downstream of the rotating blade cascade, wherein the rotating blade cascade and the guide vane cascade each have an aspect ratio of a mean height to a mean chord length of a blade or vane, wherein the compressor stages are configured and arranged where a value of a ratio between the aspect ratio of the second rotating blade cascade and the aspect ratio of the last rotating blade cascade for the entire rotating blade cascade and guide vane cascade of the compressor is greater than 2.0.

7. The compressor according to claim 6, wherein the value of a ratio between the aspect ratio of the second rotating blade cascade and the aspect ratio of the penultimate guide vane cascade and/or wherein the value of the ratio between the aspect ratio of the second rotating blade cascade and the aspect ratio of the last rotating blade cascade is greater than 2.2.

8. The compressor according to claim 6, wherein the value of a ratio between the aspect ratio of the first guide vane cascade and the aspect ratio of the penultimate guide vane cascade is greater than 3.0.

9. The compressor according to claim 6, wherein the compressor has more than six compressor stages, which are arranged in succession in a flow direction of the compressor.

10. The compressor according to claim 6, wherein the aspect ratio of the first rotating blade cascade is smaller than that of the second rotating blade cascade and of the third rotating blade cascade.

11. A compressor, for an engine, which has compressor stages arranged in succession in a flow direction of the compressor and each compressor stage has a rotating blade cascade and a guide vane cascade arranged downstream of the rotating blade cascade, wherein the rotating blade cascade and the guide vane cascade each have an aspect ratio of a mean height to a mean chord length of a blade or vane, wherein the compressor stages are configured and arranged where a value of a ratio between an aspect ratio of the first guide vane cascade and an aspect ratio of the penultimate guide vane cascade for the entire rotating blade cascade and guide vane cascade of the compressor is greater than 2.8.

12. The compressor according to claim 11, wherein the value of a ratio between the aspect ratio of the second rotating blade cascade and the aspect ratio of the penultimate guide vane cascade and/or wherein a value of a ratio between the aspect ratio of the second rotating blade cascade and the aspect ratio of the last rotating blade cascade is greater than 2.2.

13. The compressor according to claim 11, wherein the value of a ratio between the aspect ratio of the first guide vane cascade and the aspect ratio of the penultimate guide vane cascade is greater than 3.0.

14. The compressor according to claim 11, wherein the compressor has more than six compressor stages, which are arranged in succession in a flow direction of the compressor.

15. The compressor according to claim 11, wherein the aspect ratio of the first rotating blade cascade is smaller than that of the second rotating blade cascade and of the third rotating blade cascade.

* * * * *